United States Patent

Araki et al.

[11] Patent Number: 5,909,300
[45] Date of Patent: Jun. 1, 1999

[54] SCANNING APPARATUS HAVING A CASCADE SCANNING OPTICAL SYSTEM

[75] Inventors: Yoshiyuki Araki; Masatoshi Takano, both of Saitama-ken; Shinji Kikuchi; Tsutomu Sato, both of Tokyo; Eiji Takasugi, Saitama-ken; Takashi Sasaki, Nagano-ken; Mitsunori Iima; Takashi Iizuka, both of Saitama-ken, all of Japan

[73] Assignee: Asahi Kogaku Kogyo Kabushiki Kaisha, Tokyo, Japan

[21] Appl. No.: 09/001,560

[22] Filed: Dec. 31, 1997

[30] Foreign Application Priority Data

Jan. 6, 1997 [JP] Japan .................................. 9-000411

[51] Int. Cl.⁶ ................................................ G02B 26/08
[52] U.S. Cl. .......................... 359/201; 359/204; 359/212; 359/216
[58] Field of Search .................................. 359/201, 202, 359/204, 212–219; 347/225, 233, 235, 241, 243; 250/234–236

[56] References Cited

FOREIGN PATENT DOCUMENTS 60-35712  2/1985  Japan .
60-57316  4/1985  Japan .
61-11720  1/1986  Japan .

OTHER PUBLICATIONS

Konica Technical Report vol. 9 (1996), along with an English language translation (No Month).

*Primary Examiner*—James Phan
*Attorney, Agent, or Firm*—Greenblum & Bernstein, P.L.C.

[57] ABSTRACT

Disclosed is a scanning apparatus having a cascade scanning optical system. The scanning apparatus includes: a first laser scanning optical system for deflecting a first scanning laser beam to scan a scanning surface to generate a first scanning line; a second laser scanning optical system for deflecting a second scanning laser beam to scan the scanning surface to generate a second scanning line, wherein the first and second laser scanning optical systems are arranged so as to align the first scanning line with the second scanning line in a main scanning direction to form a single scanning line, with opposing ends of the first and second scanning lines overlapping each other by a predetermined amount; and a device for delaying the commencement of the writing of each scanning line made by the second laser scanning optical system with respect to the commencement of the writing of each scanning line made by the first laser scanning optical system so as to align the first scanning line with the second scanning line at a point of contact therebetween in the main scanning direction without the first scanning line overlapping the second scanning line.

10 Claims, 3 Drawing Sheets

SCANNING APPARATUS HAVING A CASCADE SCANNING OPTICAL SYSTEM

BACKGROUND OF THE INVENTION

1. Field of the Invention

The present invention relates to a cascade scanning optical system having a pair of laser scanning optical systems which are arranged along the main scanning direction and controlled to operate in synchronization with each other so as to realize a wide scanning line. More specifically the present invention relates to a scanning apparatus having such a cascade scanning optical system in which the rotation of a polygon mirror of one laser scanning optical system is synchronized with the rotation of a polygon mirror of the other laser scanning optical-system to prevent a pair of scanning lines that are to be aligned, respectively generated by the pair of laser scanning optical systems, from being deviated from each other in the main scanning direction.

2. Description of the Related Art

A cascade scanning optical system having a plurality of laser scanning optical systems arranged along the main scanning direction to realize a wide scanning line is known. Such a type of scanning optical system is disclosed in Japanese Laid-Open Patent Publication No.61-11720, published on Jan. 20, 1986. This publication discloses a cascade scanning optical system having a pair of laser scanning optical systems each having a laser beam emitter, a polygon mirror serving as a deflecting device, an fθ lens, etc. The pair of laser scanning optical systems are synchronously driven to emit respective scanning laser beams to a photoconductive surface (scanning surface) of a photoconductive drum on a common line thereon extending in parallel to the axial direction of the photoconductive drum. The pair of scanning laser beams respectively scan two adjacent ranges of the common line on the photoconductive surface so as to scan the photoconductive surface of the photoconductive drum in the main scanning direction in a wide range.

There is a fundamental problem to be overcome in such a type of cascade scanning optical system. Namely, how can a scanning line, made on the photoconductive drum by the scanning laser beam emitted from one laser scanning optical system of the cascade scanning optical system, be accurately aligned with another scanning line, made on the photoconductive drum by the scanning laser beam emitted from another laser scanning optical system of the cascade scanning optical system, so that the scanning lines are not apart from each other or overlap each other in the main scanning direction, i.e., so as to form a straight and continuous scanning line through the combination of the separate scanning lines.

SUMMARY OF THE INVENTION

The primary object of the present invention is to provide a scanning apparatus having a cascade scanning optical system in which a scanning line, made by the scanning laser beam emitted from one of a pair of laser scanning optical systems, and another scanning line, made by the other laser scanning optical system, are prevented from deviating from each other in the main scanning direction on a scanning surface.

To achieve the object mentioned above, according to an aspect of the present invention, there is provided a scanning apparatus having a cascade scanning optical system, including: a first laser scanning optical system for deflecting a first scanning laser beam to scan a scanning surface to generate a first scanning line; a second laser scanning optical system for deflecting a second scanning laser beam to scan the scanning surface to generate a second scanning line, wherein the first and second laser scanning optical systems are arranged so as to align the first scanning line with the second scanning line in a main scanning direction to form a single scanning line, with opposing ends of the first and second scanning lines overlapping each other by a predetermined amount; and a device for delaying the commencement of the writing of each scanning line made by the second laser scanning optical system with respect to the commencement of the writing of each scanning line made by the first laser scanning optical system so as to align the first scanning line with the second scanning line at a point of contact therebetween in the main scanning direction without the first scanning line overlapping the second scanning line.

Preferably, the scanning apparatus further includes a memory for storing a time interval, wherein the delaying device delays the commencement of the writing of each scanning line made by the second laser scanning optical system by the time interval with respect to the commencement of the writing of each scanning line by the first laser scanning optical system.

Preferably, the scanning apparatus further includes: a first laser beam detector for detecting the first scanning laser beam at a fixed position; and a second laser beam detector for detecting the second scanning laser beam at a fixed position, wherein the time interval is determined in accordance with times of detection of the first and second laser beam detectors.

Preferably, the first laser scanning optical system includes a first polygon mirror for deflecting the first scanning laser beam to scan a part of the scanning surface to generate the first scanning line, wherein the second laser scanning optical system includes a second polygon mirror for deflecting the second scanning laser beam to scan another part of the scanning surface to generate the second scanning line, and wherein the first and second polygon mirrors rotate in opposite rotational directions so that the first and second scanning laser beams respectively scan the part and the another part of the scanning surface from an approximate center of the scanning surface toward respective opposite ends of the scanning surface in opposite directions.

Preferably, the first laser beam detector detects the first scanning laser beam before the first scanning laser beam scans the part of the scanning surface, and the second laser beam detector detects the second scanning laser beam before the second scanning laser beam scans the another part of the scanning surface.

Preferably, the scanning apparatus further includes a processor for controlling emissions of the first and second scanning laser beams, wherein the delaying device includes a delay circuit, and wherein the first laser beam detector is directly connected to the processor, and wherein the second laser beam detector is connected to the processor through the delay circuit.

Preferably, the first laser beam detector is positioned outside a first optical path through which the first scanning laser beam passes to form the first scanning line, and wherein the second laser beam detector is positioned outside a second optical path through which the second scanning laser beam passes to form the second scanning line.

Preferably, the cascade scanning optical system further includes a drum having the scanning surface on a periphery of the drum.

Preferably, the first and second laser scanning optical systems are composed of the same optical elements.

Preferably, the first and second laser scanning optical systems are symmetrically arranged.

The present disclosure relates to subject matter contained in Japanese Patent Application No.9-411 (filed on Jan. 6, 1997) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

Figure 1:
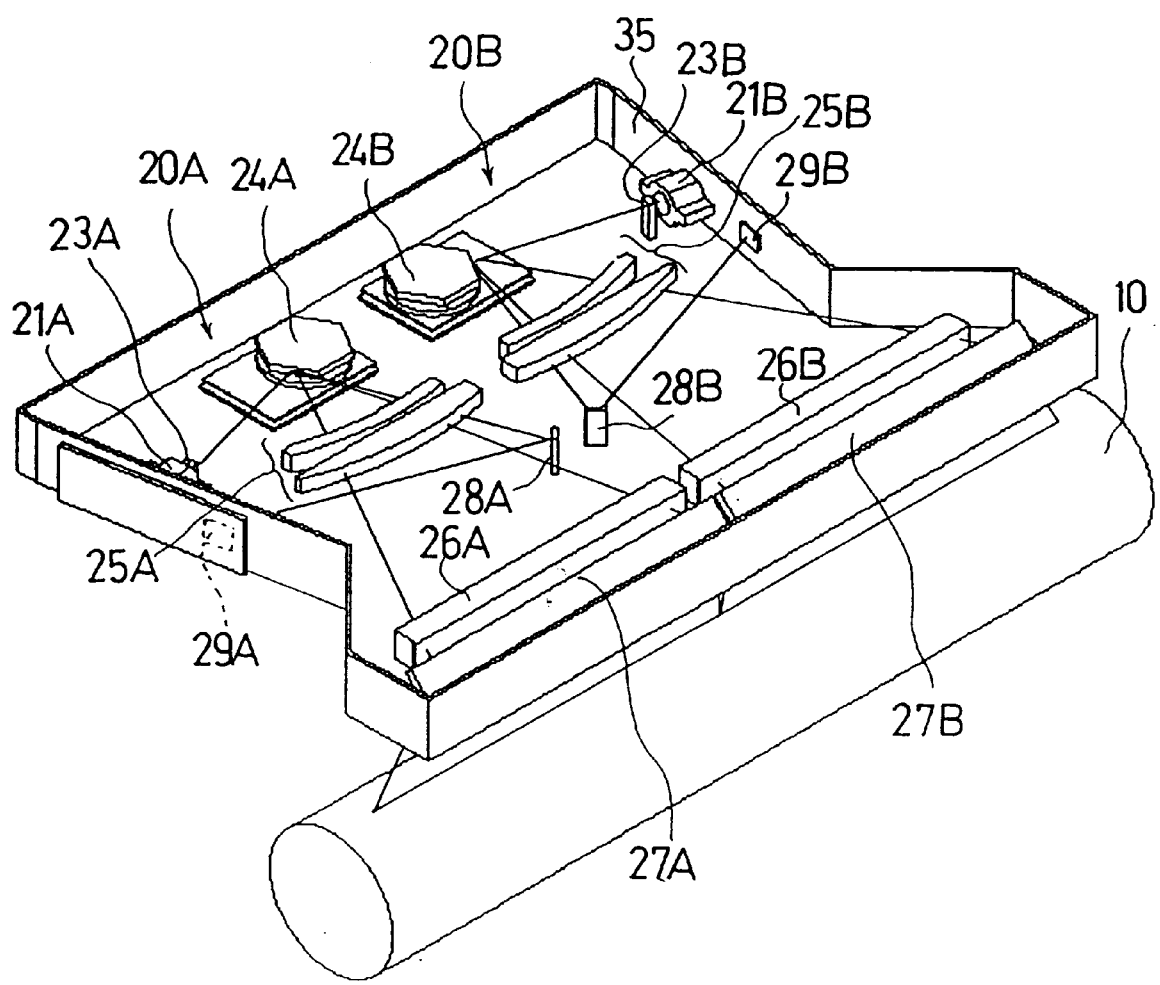
FIG. 1 is a perspective view of an embodiment of a cascade scanning optical system to which the present invention is applied, showing only fundamental elements thereof.

FIG. 1 shows an embodiment of a cascade scanning optical system for scanning the photoconductive surface of a photoconductive drum (rotating member) 10 provided in a laser-beam printer (scanning apparatus). The cascade scanning optical system is provided with a pair of laser scanning optical systems, i.e., a first scanning optical system 20A and a second scanning optical system 20B. The first and second optical systems 20A and 20B are each designed as a non-telecentric system, so that the incident angle of a scanning laser beam emitted from each of the first and second optical systems 20A and 20B relative to the photoconductive surface of the drum 10 varies in accordance with a variation in the position of the scanning spot of the scanning laser beam on the photoconductive surface in the main scanning direction. The first and second scanning optical systems 20A and 20B are provided with the same optical elements or parts, that is, the first scanning optical system 20A is provided with a laser collimating unit 21A serving as a laser beam emitter, a cylindrical lens 23A, a polygon mirror (scanning laser beam deflector) 24A, an fθ lens group 25A, an auxiliary lens 26A and a mirror 27A, while the second scanning optical system 20B is provided with a laser collimating unit 21B serving as a laser beam emitter, a cylindrical lens 23B, a polygon mirror (scanning laser beam deflector) 24B, an fθ lens group 25B, an auxiliary lens 26B and a mirror 27B. Each of the fθ lens groups 25A and 25B consists of two lens elements as can be seen from FIG. 1. The first and second scanning optical systems 20A and 20B are arranged side by side in a direction parallel to the axial direction of the drum 10 and are supported by a common casing 35 on an inner flat surface thereof.

The laser collimating units 21A and 21B are identical. Each of the laser collimating units 21A and 21B is provided therein with a laser diode LD and a collimating lens group (not shown) for collimating the laser beam emitted from the laser diode LD. In each of the first and second scanning optical systems 20A and 20B, the laser beam emitted from the laser diode LD is collimated through the collimating lens group. Thereafter this collimated laser beam is incident upon the cylindrical lens 23A or 23B positioned in front of the corresponding laser collimating unit 21A or 21B. Each cylindrical lens 23A or 23B has a power in the sub-scanning direction, so that the laser beam incident on the cylindrical lens is condensed therethrough in the sub-scanning direction to be incident on the corresponding polygon mirror 24A or 24B. The polygon mirrors 24A and 24B are each rotated, so that laser beams incident thereon are deflected in the main scanning direction to proceed toward the mirrors 27A and 27B through the fθ lens groups 25A and 25B and the auxiliary lenses 26A and 26B, respectively. Subsequently, the laser beams incident upon the mirrors 27A and 27B are reflected thereby towards the photoconductive drum 10, to thereby scan the same in the main scanning direction.

Each of the auxiliary lenses 26A and 26B has a power mainly in the sub-scanning direction. In order to reduce the size of the cascade scanning optical system, it is possible to omit each of the auxiliary lenses 26A and 26B. In such a case, the design of the fθ lens groups 25A and 25B would be modified in such a way that they would have the equivalent power to that of the combined power of the original fθ lens groups 25A and 25B and the auxiliary lenses 26A and 26B, respectively.

Figure 2:
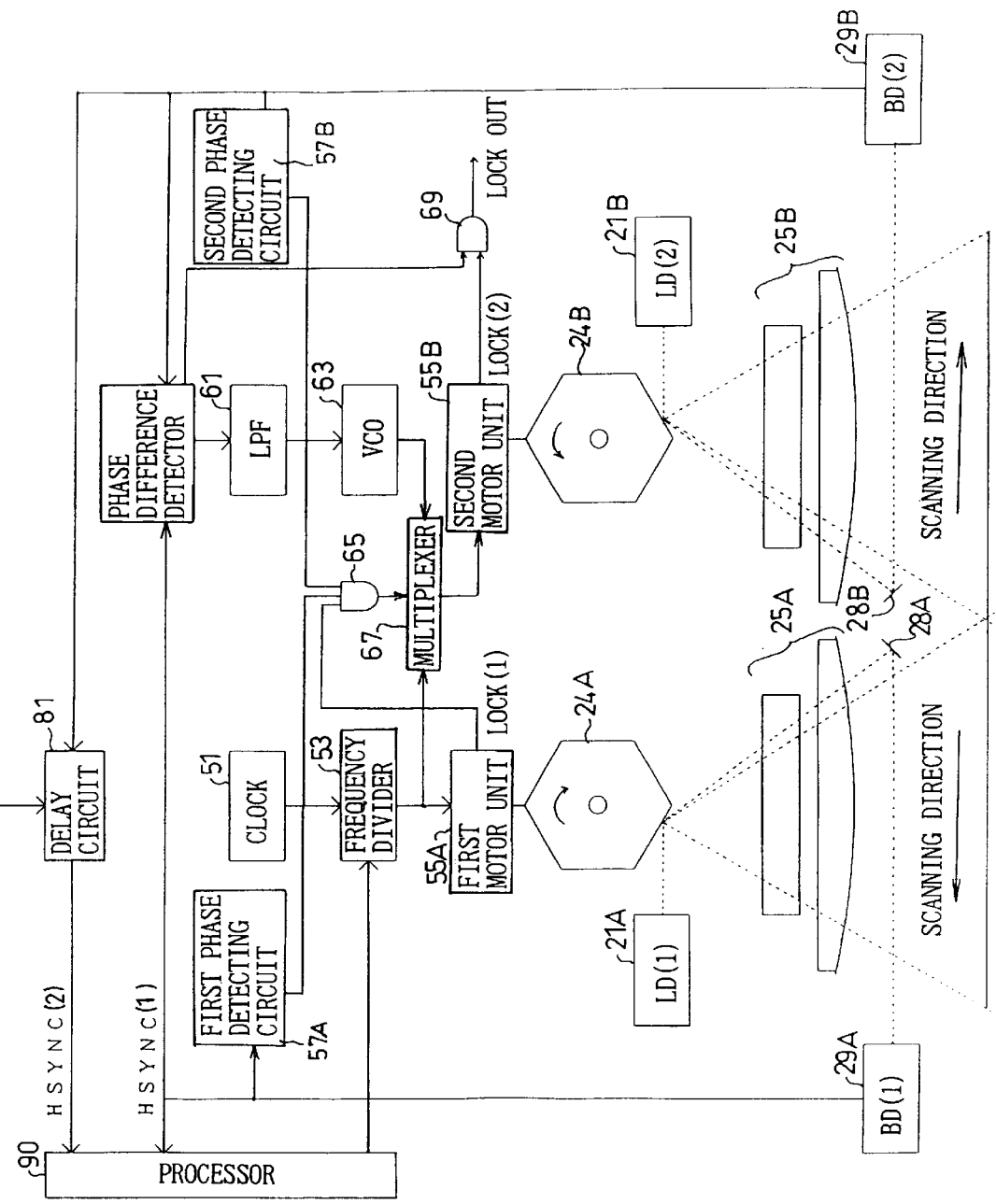
FIG. 2 is a block diagram of an embodiment of a circuit for controlling the cascade scanning optical system shown in FIG. 1.

The polygon mirror 24A rotates in a clockwise direction while the polygon mirror 24B rotates in a counterclockwise direction, as viewed in FIG. 2. Namely, the polygon mirrors 24A and 24B rotate in opposite rotational directions to scan the photoconductive surface of the drum 10 from its approximate center toward respective opposite ends in opposite directions. A mirror 28A is fixedly provided in the casing 35 at a position to receive the scanning laser beam emitted from the fθ lens group 25A before the scanning laser beam is incident on the photoconductive surface of the drum 10 through the auxiliary lens 26A and the mirror 27A at Ad each scanning sweep while the polygon mirror 24A rotates. The laser beam reflected by the mirror 28A is incident on a laser beam detector (BD) 29A fixedly provided in the casing 35 at a position opposite to the mirror 28A. Likewise, a mirror 28B is fixedly provided in the casing 35 at a position to receive the scanning laser beam emitted from the fθ lens group 25B before the scanning laser beam is incident on the photoconductive surface of the drum 10 through the auxiliary lens 26B and the mirror 27B at each scanning sweep while the polygon mirror 24B rotates. The laser beam reflected by the mirror 28B is incident on a laser beam detector (BD) 29B fixedly provided in the casing 35 at a position opposite to the mirror 28B.

The laser diodes LD of the laser collimating units 21A and 21B are each controlled by a processor 90 (see FIG. 2) to turn its laser emission ON or OFF in accordance with given image data to draw a corresponding image (charge latent image) on the photoconductive surface of the drum 10, and subsequently this image drawn on the photoconductive surface of the drum 10 is transferred to plain paper according to a conventional electrophotographic method. The aforementioned image data input to the processor 90 may be supplied thereto from a computer (not shown). The polygon mirrors 24A and 24B are controlled synchronously with the use of the laser beam detectors 29A and 29B such that on the photoconductive surface of the drum 10, respective spots of the scanning laser beams deflected by the polygon mirrors 24A and 24B move from an approximate center in opposite directions apart from each other in the main scanning direction to thereby form a wide scanning line (comprised of the pair of scanning lines) on the photoconductive surface of the drum 10. With the rotational movement of the photoconductive drum 10 which is synchronized to the rotational movement of each of the polygon mirrors 24A and 24B, a series of wide scanning lines are made on the photoconductive surface of the drum 10 to thereby obtain a certain image (charge-latent image) on the photoconductive surface of the drum 10.

FIG. 2 shows an overall structure of the controller for controlling the cascade scanning optical system of the present embodiment. The first and second polygon mirrors 24A and 24B are rotated by first and second motor units 55A and 55B, respectively. When the first and second motor units 55A and 55B start operating upon the power switch turned ON, the motor units 55A and 55B are each controlled, rotating with common clock pulses output from a frequency divider 53 which receives clock pulses from a clock pulse generator 51. The frequency divider 53 divides the frequency of input pulses, received from the clock pulse generator 51, by a predetermined fixed value to output the resulting frequency of pulses to the motor unit 55. After the rotation of each motor unit 55A, 55B has become stable and the PLL (phase-lock loop) starts, the rotational speed of the second polygon mirror 24B, i.e., the rotational speed of the second motor unit 55B, is controlled in accordance with signals which are output from the second laser beam detector 29B each time the first laser beam detector 29A detects the laser beam emitted from the first polygon mirror 24A. Each motor unit 55A, 55B is provided with a motor having a drive shaft on which the corresponding polygon mirror 24A or 24B is fixed.

The first laser beam detector 29A outputs a signal to both a first phase detecting circuit 57A and a phase difference detector 59 at the time the first laser beam detector 29A detects a scanning laser beam. The second laser beam detector 29B outputs a signal to a second phase detecting circuit 57B, the phase difference detector 59 and a delay circuit (time-delay circuit) 81 at the time the second laser beam detector 29B detects a scanning laser beam. The phase difference detector 59 determines a phase difference between the phase of signals output from the first laser beam detector 29A and the phase of signals output from the second laser beam detector 29B in accordance with the signals input from the first and second laser beam detectors 29A and 29B to output a phase difference indicating voltage to both an LPF (low pass filter) 61 and an AND gate 69. The terms "phase difference indicating voltage" herein used mean a voltage which indicates the magnitude of a phase difference. In the case where the phase of signals output from the second laser beam detector 29B follows the phase of signals output from the first laser beam detector 29A, the phase difference detector 59 outputs a positive phase difference indicating voltage. Conversely, in the case where the phase of signals output from the second laser beam detector 29B precedes the phase of signals output from the first laser beam detector 29A, the phase difference detector 59 outputs a negative phase difference indicating voltage.

Inputting a phase difference indicating voltage output from the phase difference detector 59, the LPF 61 converts the phase difference indicating voltage into a DC voltage corresponding to the magnitude of the input phase difference indicating voltage. Subsequently, the LPF 61 outputs the DC voltage to a VCO (voltage controlled oscillator) 63. The VCO 63 changes the frequency of clock pulses output therefrom in accordance with the DC voltage input from the LPF 61. In this particular embodiment, the VCO 63 outputs clock pulses having a high frequency to a multiplexer 67 when the DC voltage input from the LPF 61 is a high voltage, while the VCO 63 outputs clock pulses having a low frequency to the multiplexer 67 when the DC voltage input from the LPF 61 is a low voltage. The multiplexer 67 adjusts clock pulses input from the frequency divider 53 in accordance with clock pulses input from the VCO 63 to output the adjusted clock pulses to the second motor unit 55B. Accordingly, in the case where the phase of signals output from the second laser beam detector 29B follows that of the first laser beam detector 29A, the rotational speed of the second motor unit 55B increases. Conversely, in the case where the phase of signals output from the second laser beam detector 29B precedes that of the first laser beam detector 29A, the rotational speed of the second motor unit 55B decreases.

The rotational speed of the second motor unit 55B varies in accordance with the variation of the frequency of clock pulses output from the VCO 63, so that the phase of signals output from the second laser beam detector 29B varies with respect to that of the first laser beam detector 29A. In the present embodiment of the scanning apparatus, the rotational speed of the second motor unit 55B is adjusted to synchronize the time of detection of the first laser beam detector 29A with the time of detection of the second laser beam detector 29B, i.e., to synchronize the phase of signals output from the first laser beam detector 29A with that of the second laser beam detector 29B. Consequently, the phase of rotation of the second polygon mirror 24B is coincident with the phase of rotation of the first polygon mirror 24A.

The signal output from the first laser beam detector 29A is directly input as a horizontal synchronizing pulse HSYNC 1 to the processor 90. The signal output from the second laser beam detector 29B is input as a horizontal synchronizing pulse HSYNC 2 to the processor 90 through the delay circuit 81. The signal output from each of the first and second laser beam detectors 29A and 29B is used as a reference signal for commencing the operation of writing main scanning data, namely, writing each main scanning line. That is, the processor 90 operates to perform a single scanning (i.e., to draw a horizontal line extending in the main scanning direction on the drum 10) in accordance with the time of reception of the signal output from each of the first and second laser beam detectors 29A and 29B.

The delay circuit 81 inputs time-delay data prestored in a memory 79 and delays the signal output therefrom by a specified time interval (time-delay) in the time-delay data with respect to the signal input from the second laser beam detector 29B, so that with the function of the delay circuit 81 the commencement of the writing of each scanning line made by the second scanning optical system 20B is delayed by the aforementioned specified time interval with respect to the commencement of the writing of each scanning line made by the first scanning optical system 20A. Therefore, with the delay circuit 81, the position of the commencement of the writing of each scanning line by the second scanning optical system 20B on the photoconductive surface of the drum 10 (hereinafter referred to as "second commencement position") is adjusted relative to the position of the commencement of the writing of each scanning line by the first scanning optical system 20A (hereinafter referred to as "first commencement position") in the main scanning direction. The aforementioned specified time interval varies according to the time-delay data stored in the memory 79. An EEPROM, a rotary switch which changes its resistance value, or the like can be used as the memory 79.

Figure 3:
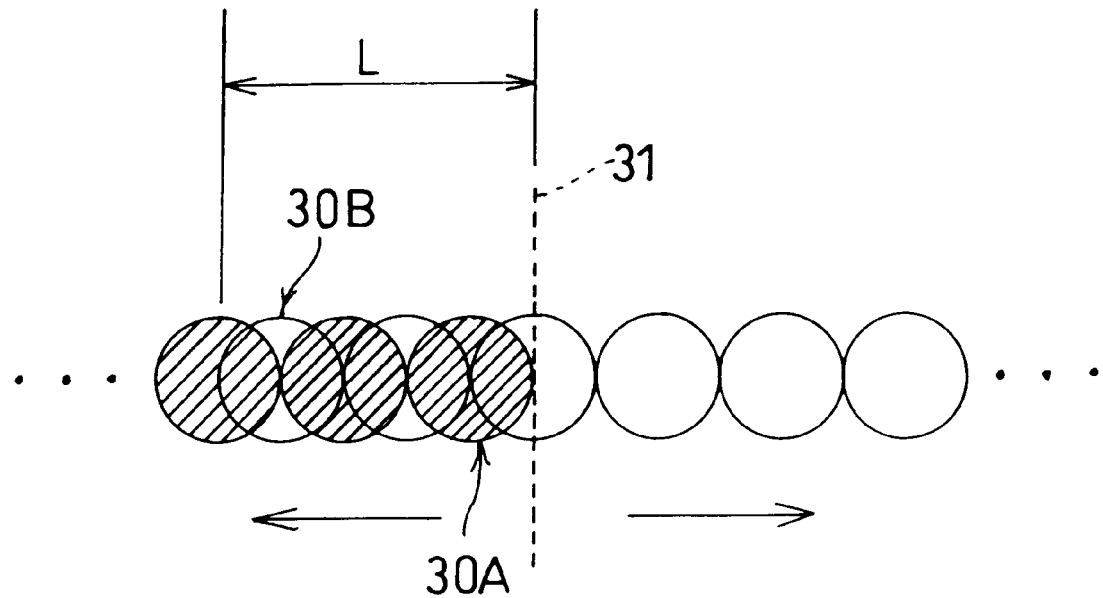
FIG. 3 is an explanatory view showing opposing ends of a pair of scanning lines, which are to be combined to form a straight scanning line, in the vicinity of the position of joining between the pair of scanning lines before the adjusting operation is performed.
Figure 4:
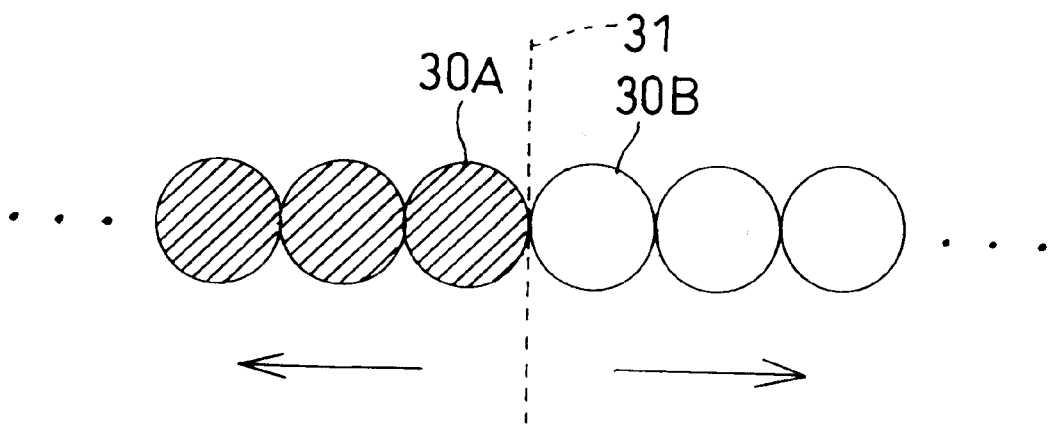
FIG. 4 is an explanatory view showing opposing ends of a pair of scanning lines, which are to be combined to form a straight scanning line, in the vicinity of the position of m joining between the pair of scanning lines after the adjusting operation has been performed.

The present embodiment of the scanning apparatus will be further discussed with reference to FIGS. 3 and 4. FIGS. 3 and 4 each show scanning spots made on the photoconductive surface of the drum 10 by the pair of scanning laser beams of the first and second scanning optical systems 20A and 20B.

The shaded spots represent those made by the first scanning optical systems 20A while non-shaded spots represent those made by the second scanning optical system 20B. A shaded spot 30A is the spot at the first commencement position while a non-shaded spot 30B is the spot at the second commencement position. In this embodiment the second commencement position (i.e., the position of the spot 30B) is adjusted relative to the first commencement position (i.e., the position of the spot 30A) in the main scanning direction. The position of the spot 30A is accordingly used as a fixed reference position for adjusting the position of the spot 30A relative to the reference position. In order to realize such a way of adjustment, the first and second scanning optical systems and the photoconductive drum 10 are arranged such that opposing ends of the pair of scanning lines which are to be aligned in the main scanning direction overlap each other in some degree as shown in FIG. 3, on the condition that the commencement of the writing of each scanning line made by the first scanning optical system 20A is substantially coincident with the commencement of the writing of each scanning line made by the second scanning optical system 20B, namely, on the condition before the adjusting operation for adjusting the second commencement position with respect to the first commencement position is performed. In FIG. 3 "L" represents the initial amount of overlap between the opposing ends of the pair of scanning lines. In FIGS. 3 and 4 the first commencement position is indicated by vertical dotted lines 31, so that in this particular embodiment it will be appreciated from FIG. 3 that the second commencement position has been intentionally shifted to the left in advance as viewed in FIG. 3 in the main scanning direction so that opposing ends of the pair of scanning lines overlap each other by the amount of overlap L.

The operation for adjusting the second commencement position with respect to the first commencement position in the present embodiment of the scanning apparatus begins with the state shown in FIG. 3. This adjusting operation is preferably performed during the process of manufacture. Firstly, the initial amount of overlap L is measured by locating each of the first and second commencement positions on the photoconductive surface of the drum 10. After the amount of overlap L has been measured, the specified time interval by which the commencement of the writing of each scanning line made by the second scanning optical system 20B is delayed with respect to the commencement of the writing of each scanning line made by the first scanning optical system 20A so as to shift the non-shaded spot 30B away from the territory of the shaded spots in the main scanning direction to reduce the amount of overlap L (i.e., to be moved to the right as viewed in FIG. 3) by a distance whose length is equivalent to, for example, one eighth of the diameter of the scanning spot made by the second scanning optical system 20B, is first stored in the memory 79 as the time-delay data. Accordingly, the delay circuit 81 delays the commencement of the writing of the following scanning line made by the second scanning optical system 20B by the aforementioned specified time interval.

Thereafter, the amount of overlap between a pair of scanning lines is again measured by locating each of the first and second commencement positions on the photoconductive surface of the drum 10 to find out whether the opposing ends of the pair of scanning lines still overlap each other. In the case where the opposing ends of the pair of scanning lines still overlap each other, another specific time interval by which the commencement of the riting of each scanning line made by the second scanning optical system 20B is delayed to further shift the non-shaded spot 30B away from the territory of the shaded spots in the main scanning direction to reduce the amount of overlap by the aforementioned distance is stored in the memory 79 as the time-delay data. The same operation is repeated until the amount of overlap between the opposing ends of the pair of scanning lines becomes zero, i.e., until the condition shown in FIG. 4 is secured. After the amount of overlap between the opposing ends of the pair of scanning lines becomes zero, the latest time-delay data stored in the memory 79 continues to be used for writing the following scanning lines made by the second scanning optical system 20B. Namely, the latest time-delay data stored in the memory 79 will not be changed at a later time. It can be appreciated from the foregoing that in the adjusting operation, the non-shaded spot 30B is shifted step by step from the shaded spot 30A in a direction that reduces the amount of overlap until the amount of overlap becomes zero. Due to this operation, the first commencement position is properly adjacent to the second commencement position 31 as shown in FIG. 4.

In the present embodiment, the aforementioned specified time interval corresponds to the amount of shifting of the non-shaded spot 30B from the shaded spot 30A in the main scanning direction by one eighth of the diameter of the scanning spot made by the second scanning optical system 20B, so that the time-delay data stored in the memory 79 has to be renewed at least once in the case where the amount of overlap between the opposing ends of the pair of scanning lines is over one eighth of the diameter of the scanning spot made by the second scanning optical system 20B. However, in the present embodiment the aforementioned specified time interval may be determined to erase the winitial amount of overlap between the opposing ends of the pair of scanning lines at one time.

In the present embodiment, the initial amount of overlap L can be measured using a CCD camera (not shown) for obtaining respective images of the shaded spot 30A and the non-shaded spot 30B to locate each of the first and second commencement positions on the photoconductive surface of the drum 10. When the initial amount of overlap L is measured, each of the first and second scanning optical systems 20A and 20B may be controlled to emit the corresponding scanning laser beam to form only the shaded spot 30A and the non-shaded spot 30B on the photoconductive drum 10. These spots, 30A and 30B, are visually displayed on a TV monitor or the like through the CCD camera to measure the initial amount of overlap L.

As can be understood from the foregoing, according to the present embodiment of the scanning apparatus, the first and second laser scanning optical systems 20A and 20B are arranged such that the initial amount of overlap L occurs on condition that the commencement of the writing of each scanning line made by the first scanning optical system 20A is substantially coincident with the commencement of the writing of each scanning line made by the second scanning optical system 20B; time-delay data used for the delay circuit 81 is appropriately adjusted to eliminate the amount of overlap L; the adjusted time-delay data is stored in the memory 79; and thereafter the delay circuit 81 operates using the time-delay data stored in the memory 79, thereby the first commencement position is properly adjacent to the second commencement position 31 as shown in FIG. 4, so that the pair of scanning lines are not apart from each other or overlap each other in the main scanning direction.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A scanning apparatus having a cascade scanning optical system, comprising:
   a first laser scanning optical system that deflects a first scanning laser beam to scan a scanning surface to generate a first scanning line;
   a second laser scanning optical system that deflects a second scanning laser beam to scan said scanning surface to generate a second scanning line, wherein said first laser scanning optical system and said second laser scanning optical system are arranged so as to align said first scanning line with said second scanning line in a main direction to form a single scanning line, opposing ends of said first scanning line and said second scanning line overlapping each other by a predetermined amount; and
   a device that delays a commencement of a writing of each scanning line made by said second laser scanning optical system with respect to a commencement of a writing of each scanning line made by said first laser scanning optical system, so as to align said first scanning line with said second scanning line at a point of contact therebetween in said main scanning direction without said first scanning line overlapping said second scanning line.

2. The scanning apparatus according to claim 1, further comprising a memory for storing a time interval, wherein said delaying device delays said commencement of said writing of each scanning line made by said second laser scanning optical system by said time interval with respect to said commencement of said writing of each scanning line by said first laser scanning optical system.

3. The scanning apparatus according to claim 2, further comprising:
   a first laser beam detector for detecting said first scanning laser beam at a fixed position; and
   a second laser beam detector for detecting said second scanning laser beam at a fixed position,
   wherein said time interval is determined in accordance with times of detection of said first and second laser beam detectors.

4. The scanning apparatus according to claim 3, wherein said first laser scanning optical system comprises a first polygon mirror for deflecting said first scanning laser beam to scan a part of said scanning surface to generate said first scanning line,
   wherein said second laser scanning optical system comprises a second polygon mirror for deflecting said second scanning laser beam to scan another part of said scanning surface to generate said second scanning line, and
   wherein said first and second polygon mirrors rotate in opposite rotational directions so that said first and second scanning laser beams respectively scan said part and said another part of said scanning surface from an approximate center of said scanning surface toward respective opposite ends of said scanning surface in opposite directions.

5. The scanning apparatus according to claim 4, wherein said first laser beam detector detects said first scanning laser beam before said first scanning laser beam scans said part of said scanning surface, and
   wherein said second laser beam detector detects said second scanning laser beam before said second scanning laser beam scans said another part of said scanning surface.

6. The scanning apparatus according to claim 3, further comprising a processor for controlling emissions of said first and second scanning laser beams,
   wherein said delaying device comprises a delay circuit, and
   wherein said first laser beam detector is directly connected to said processor, and
   wherein said second laser beam detector is connected to said processor through said delay circuit.

7. The cascade scanning optical system according to claim 3, wherein said first laser beam detector is positioned outside a first optical path through which said first scanning laser beam passes to form said first scanning line, and wherein said second laser beam detector is positioned outside a second optical path through which said second scanning laser beam passes to form said second scanning line.

8. The cascade scanning optical system according to claim 1, further comprising a drum having said scanning surface on a periphery of said drum.

9. The cascade scanning optical system according to claim 1, wherein said first and second laser scanning optical systems are composed of the same optical elements.

10. The cascade scanning optical system according to claim 9, wherein said first and second laser scanning optical systems are symmetrically arranged.

* * * * *